United States Patent [19]

Attenello

[11] Patent Number: 5,720,359
[45] Date of Patent: Feb. 24, 1998

[54] ADJUSTABLE FLOORBOARD

[76] Inventor: Pasquale J. Attenello, 14 Griffin Rd. South, Bloomfield, Conn. 06002

[21] Appl. No.: 545,363

[22] Filed: Oct. 18, 1995

[51] Int. Cl.⁶ .................................................. B62J 25/00
[52] U.S. Cl. ...................... 180/219; 403/3; 280/291; 280/163
[58] Field of Search ........................ 180/219; 280/288.4, 280/291, 163; 403/3, 4, 327, 326, 325, 321

[56] References Cited

U.S. PATENT DOCUMENTS

| | | | |
|---|---|---|---|
| 2,501,890 | 3/1950 | Desso, Sr. et al. | 403/325 X |
| 2,545,813 | 3/1951 | Jackson | 403/325 X |
| 2,682,414 | 6/1954 | Richardson | 403/325 X |
| 4,174,852 | 11/1979 | Panzica et al. | 280/291 |
| 4,546,993 | 10/1985 | Walker | 280/291 |

FOREIGN PATENT DOCUMENTS

| | | | |
|---|---|---|---|
| 458567 | 3/1928 | Germany | 280/291 |
| 484952 | 10/1929 | Germany | 280/291 |
| 3-000583 | 1/1991 | Japan | 280/291 |
| 3-235776 | 10/1991 | Japan | 280/291 |
| 276167 | 8/1927 | United Kingdom | 280/291 |

*Primary Examiner*—Victor E. Johnson
*Attorney, Agent, or Firm*—Fishman, Dionne, Cantor & Colburn

[57] ABSTRACT

A moveable driver floorboard device for motorcycles, which allows the driver to make rapid and easy adjustments to the preset positions in the driver's floorboard plates that hold the floorboards. The adjustable floorboard device may be applied to existing fixed floorboard systems that may already be on a motorcycle or they may also be used as a complete new system with new floorboards and new brake lever, along with the adjustable plates and associated hardware. The invention allows for immediate adjustments without unbolting and reinstallation of the existing floorboards.

3 Claims, 1 Drawing Sheet

ADJUSTABLE FLOORBOARD

SUMMARY OF THE INVENTION

This invention is an adjustable floorboard device for motorcycles that allows for quick and easy adjustment of the floorboards, allowing for multiple positions to aid in the comfort of the driver. The adjustment also allows the driver to change the floorboards to the conditions of the road, from highway to curving roads, thus changing both height and leg distance of the floorboards.

An object of this invention is to provide the ability to change position of the leg and foot distance, to help prevent fatigue on long distance driving.

Another object of this invention is the capability to retrofit existing fixed floorboards.

BRIEF DESCRIPTION OF THE DRAWINGS

In the following drawings is a detailed description of this invention consisting of different views.

DETAILED DESCRIPTION

Figure 1:
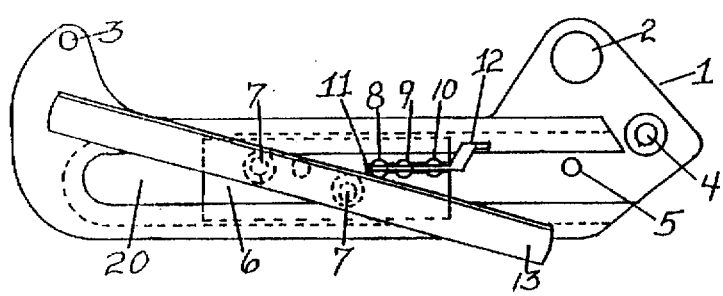
FIG. 1 is a side view of the left plate.
Figure 2:
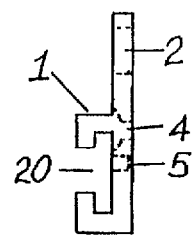
FIG. 2 is a rear view of FIG. 1.

Similar reference characters indicate corresponding parts throughout the views in the drawings.

The adjustable floorboard device is comprised of metal, consisting of a left plate and a right plate. Each plate includes a sliding block and a locking mechanism.

Figure 5:
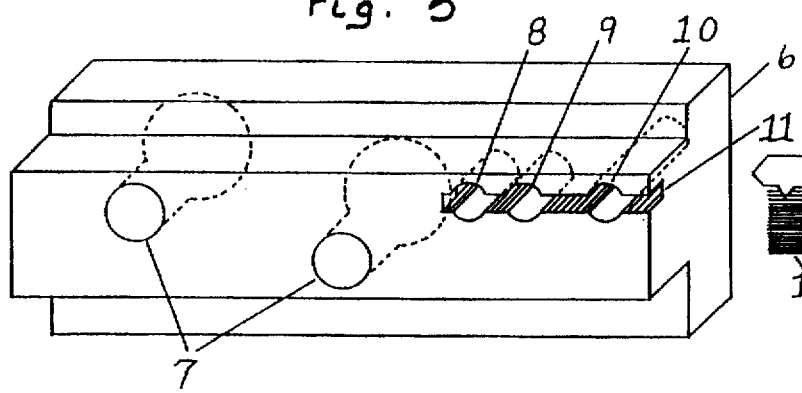
FIG. 5 is a perspective view of the sliding block.
Figure 6:
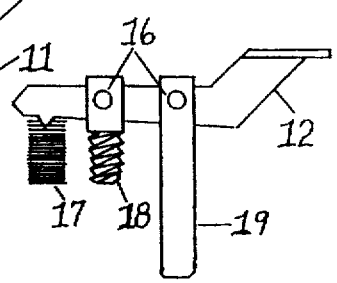
FIG. 6 is a detailed, fragmentary view of locking device.
Figure 7:
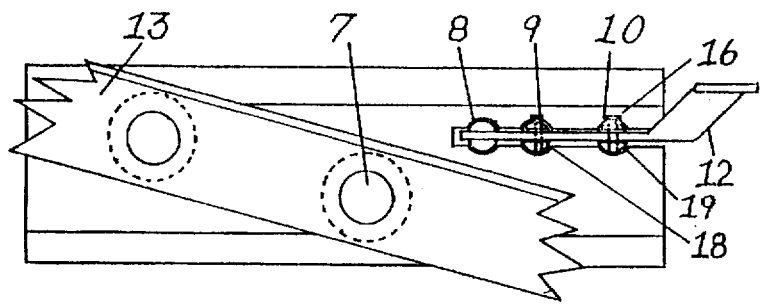
FIG. 7 is a flat view of the side of the sliding block.
Figure 8:
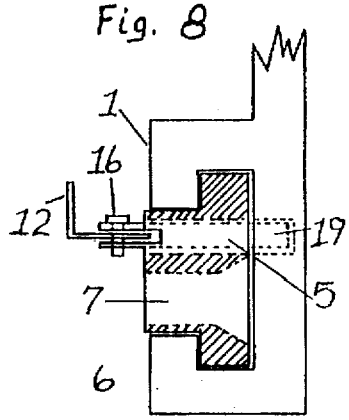
FIG. 8 is a rear view of the left plate with the sliding block and locking mechanism.

Referring to the drawings and particularly FIG. 1, FIG. 5, and FIG. 6 when noted, it will be made apparent the function of this invention.

Left plate 1 and right plate 14 (shown in FIG. 3) are bolted to the motorcycle by the front bolt hole 3 and rear bolt hole 4 to the applicable locations of the motorcycle. Heel-toe shifter hole 2 is located on the left plate 1, which accommodates the heel-toe shifter pivot bolt.

Floorboard 13 is bolted onto the sliding block 6 by two tapered head bolts from the backside of the sliding block 6 through bolt holes 7 (shown in FIG. 5) that thread into the backside of floorboard 13.

Figure 3:
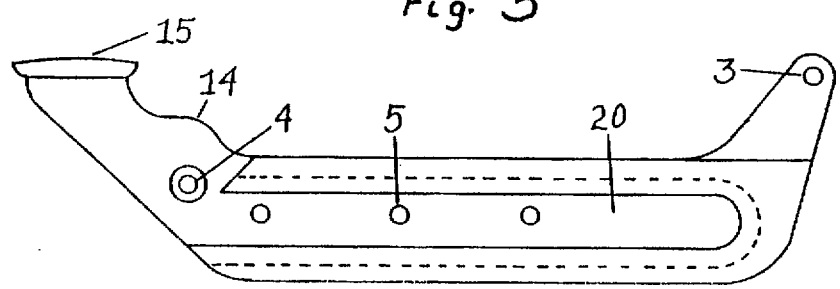
FIG. 3 is a side view of the right plate.
Figure 4:
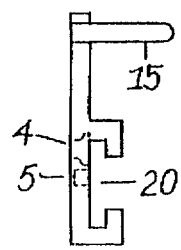
FIG. 4 is a rear view of FIG. 3.

Sliding block 6 moves in slideway 20. To move sliding block 6, locking lever 12 is moved away from sliding block 6, which releases locking pin 19 (shown in FIG. 6) from any position hole 5. Releasing locking pin 19 (shown in FIG. 6) from any position hole 5 allows sliding block 6 to move in slideway 20 until locking pin 19 relocates in a position hole 5. Spring 17 (shown in FIG. 6) is located in sliding block 6, hole 8. The constant pressure against a first end of the locking lever 12 keeps constant down pressure on locking pin 19 at a second end of locking lever 12. Locking lever 12 is attached at pivot hole 9. Both pivot pin 18 and locking pin 19 are held onto locking lever 12 by press pins 16. The whole locking mechanism is held in alignment by being in locating slot 11 (shown in FIG. 5). Brake heel rest 15 is welded to the right plate 14 as shown in FIG. 3.

While the specific form of this invention has been described and illustrated herein, it is to be understood that the same may be varied, within the scope of the appended claims without departing from the spirit of the invention.

What is claimed is:

1. An adjustable floorboard device for mounting to a motorcycle and receiving a floorboard, the adjustable floorboard device comprising:

a plate having a slideway formed therein, said plate including a plurality of positioning holes;

a sliding block for traveling within said slideway, said sliding block receiving a floorboard; and a locking mechanism for preventing said sliding block from moving in said slideway, said locking mechanism including a locking lever having a locking pin attached at a first end of said locking lever and a spring positioned at a second end of said locking lever, said spring forcing said locking pin into one of said positioning holes.

2. The adjustable floorboard device of claim 1 wherein said sliding block includes a slot and said locking mechanism is positioned in said slot.

3. The adjustable floorboard device of claim 1 wherein said plate further comprises a heal-toe shifter hole formed therein.

* * * * *